Figure 1:
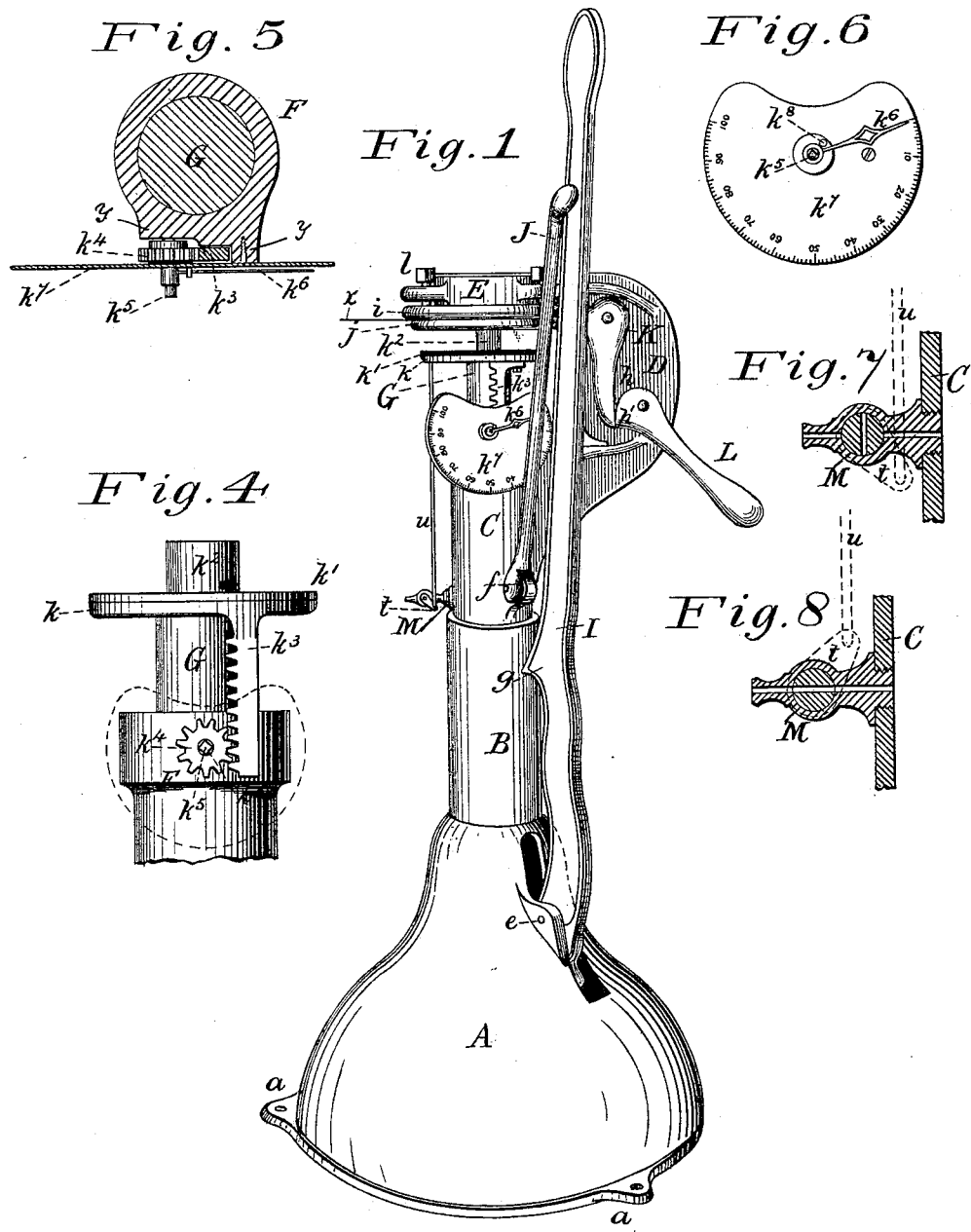

(No Model.) 2 Sheets—Sheet 1.

S. D. LOCKE.
METHOD OF AND MECHANISM FOR TESTING FABRICS AND OTHER SHEET MATERIALS.

No. 360,103. Patented Mar. 29, 1887.

WITNESSES:
N. N. Lovegrove.
L. C. Hill.

INVENTOR:
Sylvanus D. Locke,
by E. B. Stocking
Atty.

(No Model.) 2 Sheets—Sheet 2.

S. D. LOCKE.
METHOD OF AND MECHANISM FOR TESTING FABRICS AND OTHER SHEET MATERIALS.

No. 360,103. Patented Mar. 29, 1887.

WITNESSES=
N. N. Lovegrove
L. C. Hills,

INVENTOR=
Sylvanus D. Locke.
by E. B. Stoelting
Atty.

UNITED STATES PATENT OFFICE.

SYLVANUS D. LOCKE, OF HOOSICK FALLS, NEW YORK.

METHOD OF AND MECHANISM FOR TESTING FABRICS AND OTHER SHEET MATERIALS.

SPECIFICATION forming part of Letters Patent No. 360,103, dated March 29, 1887.

Application filed August 16, 1886. Serial No. 211,052. (No model.)

*To all whom it may concern:*

Be it known that I, SYLVANUS D. LOCKE, a citizen of the United States, residing at Hoosick Falls, in the county of Rensselaer and State of New York, have invented certain new and useful Improvements in Methods of and Means for Testing Materials, of which the following is a specification, reference being had therein to the accompanying drawings.

This invention has relation to mechanism for testing the strength of material in sheet form, or, it may be, in the form of cords or bands; and it has reference more particularly to any machine of the class described which is adapted to test any material at a portion wholly within its edges by applying pressure upon the selected portion and measuring the degree of pressure applied.

The invention in this instance consists, first, in the method of testing fabric, which consists in applying air under pressure to operate a plunger in such a manner that the air escaping from a compressing-chamber shall force the plunger with a gradually-increasing pressure against the fabric until the latter is ruptured; second, in the combination of the piston and plunger, a spring mounted thereon between its pressure or rupturing end that presses against the fabric and the piston end, and a spring-meter having a dial-plate and hand, whereby the pressure against the fabric is indicated and registered; third, in the combination, with a piston-plunger and its chamber, of a cylindrical compressing-chamber connected by a port with the plunger-chamber and having a piston, whereby the air is first compressed in the compressing-chamber and then allowed to slowly and gradually escape through the port into the plunger-chamber, to automatically measure the time taken to rupture the fabric; fourth, in the combination, with the compressing-chamber and its piston, of a spring in the piston between its head and the piston-rod that is compressed as the piston is forced down to its full stroke and expands as the air escapes into the plunger-cylinder, whereby the air-pressure in the compressing-chamber is maintained for a definite period nearly constant; and, fifth, in certain combinations and features of construction, which produce an advantageous mode of operation, as hereinafter described, and which, so far as they are novel, are particularly pointed out in the claims.

Figure 2:
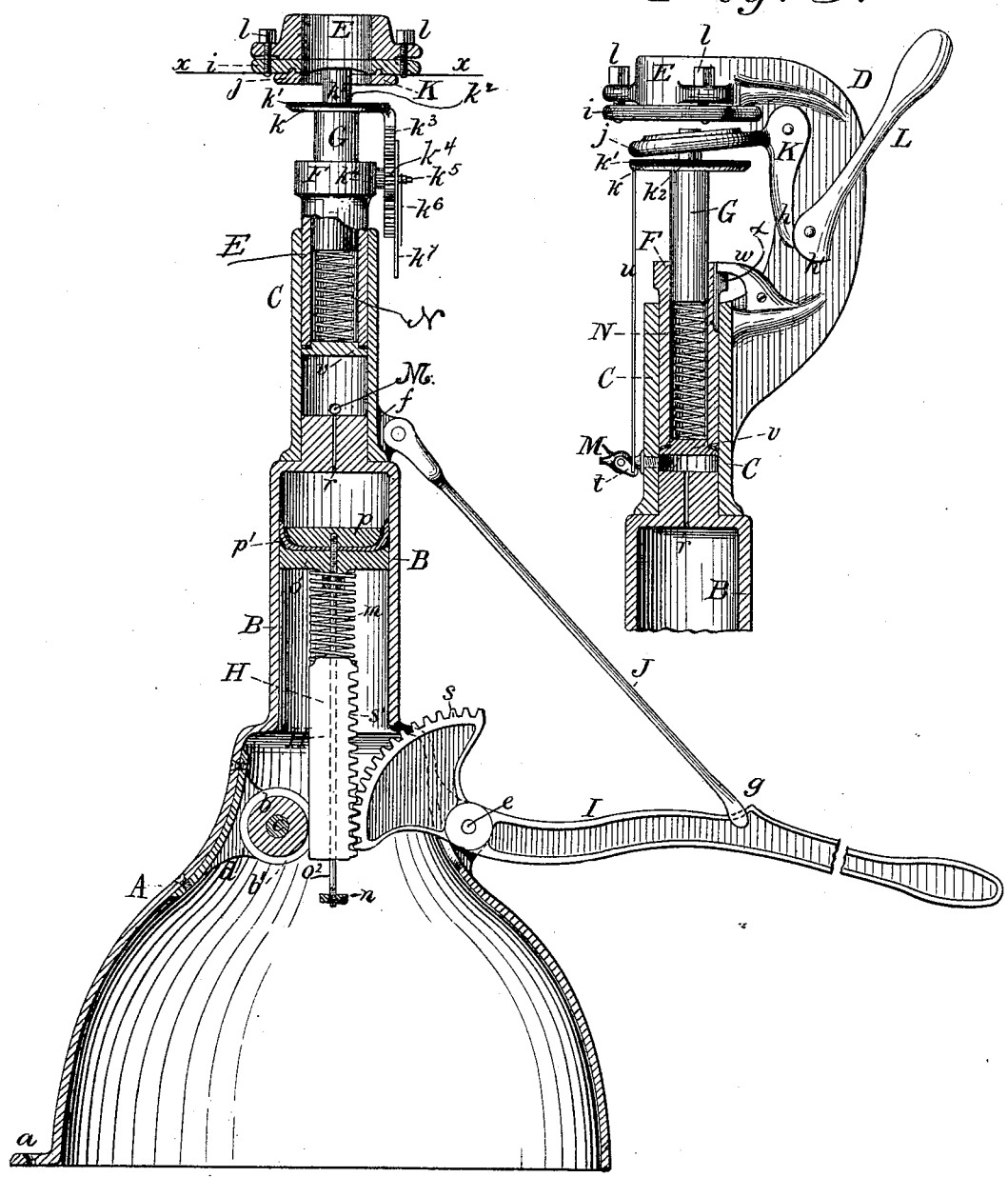
Figure 3:
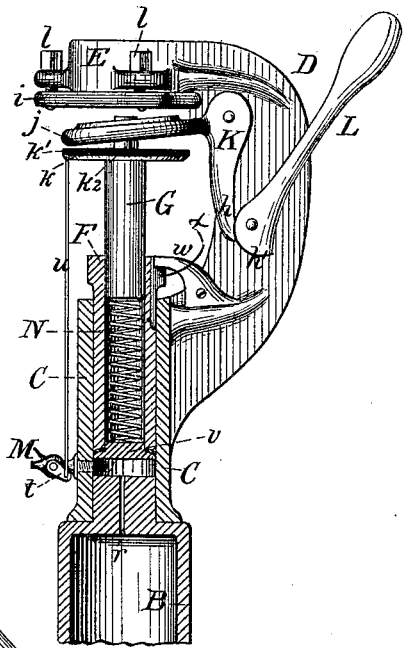

Referring to the drawings, Figure 1 is a perspective of a testing-machine embodying my invention. Fig. 2 is a central vertical section with parts in side elevation and represented as applying pressure to a fabric. Fig. 3 is a similar view of the upper portion of the machine with the parts in position to receive a fabric to be tested. Fig. 4 is an enlarged side elevation of the upper part of the standard with the plunger, rack-bar, and pinion, the dotted lines showing the position on the dial. Fig. 5 is a transverse section of the same and the dial on a line above the pinion. Fig. 6 is an elevation of the dial with its indicator or pointer. Fig. 7 is a section through the cock M and a portion of the wall of the cylinder C, with the arm $t$ and lever $u$ in dotted lines, the cock being closed. Fig. 8 is a similar view, the cock being open.

Like letters of reference indicate like parts in all the figures of the drawings.

A represents a base, which in this instance consists of a hollow casting, provided at its lower edge with a lug, $a$, perforated for the reception of bolts or screws for securing the base to a floor or other support. The upper end of the base is extended in the form of a cylinder, B, upon which is mounted an air-chamber or plunger-cylinder, C, a port, $r$, serving as a communication between the chamber and the cylinder. A curved standard, D, extends from the chamber and terminates in a collar, E, which is arranged concentric with the chamber. Within the chamber is a sleeve, F, and within the sleeve is a piston, G, terminating in what may be designated as a "plunger" or "pressure-rod," $k^2$.

Within the cylinder B and base A is arranged a rack-bar, H, having at one edge its teeth S', which mesh with a sector, S, forming the shorter arm of a lever, I, pivoted to the base at $e$, and passing through a slot in the same, as clearly shown. A rod, J, pivoted to the side of the chamber C at $f$, is adapted to ride at its free end upon the upper edge of the lever I and take against a stop or projection, $g$, thereon, in order to hold the lever with its free end depressed, as clearly shown in Fig. 2.

The edge of the rack-bar H opposite its teeth is straight, and rides against a pulley, $b$, which is grooved on its periphery, as at $b'$, to keep the rack-bar in proper alignment with the sector. The pulley $b$ is mounted in a bracket, $d$, secured to the inner surface of the base.

The lower end of the sleeve F is closed by a disk, $v$, and between the disk and the piston G there is arranged in the sleeve a coiled spring, N. The upper part of the sleeve F has formed thereon projections adapted to receive a stud, $k^5$, for a pinion, $k^4$, a dial-plate, $k^7$, and otherwise constructed to permit the operation of a rack-bar, $k^3$, depending from a horizontal flange, $k$, formed on the piston G. This flange $k$ is designed as a stop to prevent the piston G from being thrown out of the sleeve when the fabric is ruptured. The lug $w$ prevents this sleeve from a too extended movement. It is made larger than the plunger for this purpose, so that as it is forced upward when the fabric is ruptured it shall squarely strike the under face of the clamp K. The striking of this flange against the clamp amounts to quite a blow. To relieve the clamp and the parts generally of the shock which they would otherwise receive from this blow, I face the upper part of the flange with an elastic cushion, $k'$, of rubber, leather, or some other elastic material. The plunger G or pressure-rod $k^2$ may be secured in any suitable manner to the flange $k$, as by a stem inserted in a central hole or mortise in the top of the piston G, by which construction I may employ plungers or pressure-rods of varying sizes and proportions.

Suitably connected with the pinion $k^4$ is an indicator or pointer, $k^6$, which, by movements of the rack-bar $k^3$, is caused to pass over the scale on the dial $k^7$ from zero, at which point further backward movement of the pointer may be prevented by a stop. This indicator, like the hour-hand of a clock, is spring-clamped on the stud $k^5$—that is to say, is provided with a hollow slitted sheet-metal hub, which is held upon the stud or shaft of the pinion by friction only—and is driven forward only by the pinion $k^4$ by means of the pin or lug $k^8$, (see Fig. 6,) projecting outward from the face of the pinion striking against the rear edge of the indicator. When the pinion runs back after the fabric is ruptured it and its stud $k^8$ run away from the indicator and leave the latter stationary on the stud and over the dial to mark the point of highest pressure.

Depending from the flange $k$ is a rod, $u$, which is connected to an arm, $t$, fixed to the plug of a valve, M, projecting from and communicating with the interior of the air-chamber C.

The collar E is provided with lugs through which bolts $l$ pass for the purpose of attaching a relatively-fixed clamp, $i$, thereto. A movable clamp, K, is pivoted to the yoke, and is in the form, as a whole, of a bell-crank lever, one arm, $j$, of which is in the form of a ring having a rib on its upper surface adapted to fit a groove in the lower surface of the fixed clamp $i$. The other arm, $h$, depends in front of a lever, L, the lower end, $h'$, of which is cam-shaped. The fixed clamp $i$, by means of the screw-bolts $l$, is adjustable with reference to the movable clamp $j$, so as to squarely clamp paper or fabric of any thickness. A small lug or bracket, $w$, projects into a groove, $x$, formed in the sleeve F, so as prevent the same from rotating during its movement in the chamber C. The projections $y$, formed on the upper end of the sleeve, are clearly shown in Fig. 5, which is a transverse section, and the different positions of the rod $u$, arm $t$, and valve M are clearly shown in the vertical sections illustrated in Figs. 7 and 8.

This being the construction, the operation is as follows: Taking the parts as being in the position illustrated in Fig. 3, a piece of material, $x$, to be tested is inserted between the fixed clamp $i$ and the movable clamping-arm $j$, and the lever L is depressed, so that the material is firmly secured above the pressure-rod or plunger, as seen in Fig. 1. The lever I is now depressed and locked by the rod $m$ in the position shown in Fig. 2, and thereby the rack-bar H is forced upwardly. Now, instead of connecting the rack-bar directly to a piston in the cylinder B, it is indirectly connected, and a spring is interposed between the piston and bar. In other words, I employ a piston comprising the plates $o$ $p$, between which is a leather or other suitable packing, $p'$, and these parts are secured together by a screw-threaded rod, $O^2$, which passes easily through the rack-bar H, and has a nut, $n$, at its lower end. A coiled spring, $m$, encircles the rod and presses against the lower surface of the piston at one end and against the upper end of the rack-bar at the other end. As the rack-bar H is forced upward the air within the cylinder above the piston is compressed until its pressure equals or exceeds the force of the spring $m$, when the piston ceases to advance, and the further movement of the rack-bar serves only to compress the spring. As the air escapes slowly through the port $r$, and the pressure above the piston is reduced, the spring $m$ recoils, forcing the piston up in the cylinder, so lessening the air-space within the cylinder and maintaining for a definite period a uniform air-pressure therein. It is evident that the spring not only maintains, as a constant, the pressure that would otherwise be quite rapidly decreasing, but it also, for this reason, lessens to a great extent the maximum force and pressure required. As the air presses through the port $r$ into the chamber C it crowds or lifts up the sleeve F and its piston G until the plunger or pressure-rod $k^2$ comes against the fabric $x$, secured in the clamps. At this stage of the operation the plunger, prevented by the fabric, ceases to advance, but the increasing pressure of the air in the chamber forces the sleeve bearing the piston $k^4$ slowly up, thus slowly compressing the spring N until its tension overcomes the strength of the fabric and the latter is ruptured. As the pinion $k^4$ is carried up it is rotated forward or to the right by the intermeshing of its teeth with those of the rack $k^3$, thus slowly carrying, by means of the pin $k^8$, the indicator $k^6$ around on the dial $k^7$ until the rupture of the fabric, when the recoil of the spring and the consequent upward movement of the plunger and rack instantly turns the pinion backward, leaving the indicator to mark on the dial the maximum or rupturing stress of the spring. At the instant that the fabric is ruptured the piston G is forced upwardly by the spring N, and by means of the connecting-rod $u$ opens the valve M, through which the air in the chamber escapes therefrom, and the piston, pressure-rod, and sleeve fall within the chamber to the position shown in Fig. 3, when, by lifting the free end of the lever L, the movable clamp is dropped and the fabric may be removed.

In any accurate test of the strength of materials it is essential that the application of force shall be exceedingly uniform, and because time is an element in determining the amount of force required, it is also essential that each additional increment of force applied to rupture the fabric shall not depend as to time or amount on the will of the operator, but shall, like the sand of an hour glass, be automatically measured out. The will of the operator ought not to control or affect the result. In this case his will extends only to the depressing and locking of the lever, after which the power to test the fabric is slowly and automatically increased and increment by increment applied.

The essential features of an advantageous mode of operation are inherent in the devices hereinbefore described, and it is apparent that the same may be modified in various ways without a departure from the general principle of my invention; and I therefore do not limit my invention to the exact construction shown and described, but reserve my right to alter the same in any manner and to any degree within the skill of persons conversant with the construction of mechanism and devices of this character.

Having described my invention and its operation, what I claim is—

1. The method of applying pressure for the purpose of testing the strength of materials, which consists in controlling the action of the compressed air against the material by lengthening the time or period of pressure beyond the time required for the action of the compressed air as produced by successive strokes of the air-compressing mechanism.

2. In mechanism of the class described, the combination of fabric-clamping devices, a pressure-rod or plunger, an air-chamber for the reception of the plunger, air-compressing mechanism, and a wall or division-plate between the air-chamber and the air-compressing mechanism provided with a port whereby the passage of the air from the compressing mechanism to the chamber is gradual, substantially as and for the purpose set forth.

3. In mechanism of the class described, the combination of two fabric-clamping devices constructed to confine an area of the fabric wholly within its edges, one of which devices is adjustable with relation to parallelism with the other, substantially as specified.

4. In mechanism of the class described, the combination of fabric-clamping devices arranged opposite the plunger and means for forcing the plunger toward the clamping devices, a plunger, and a piston provided with a flange for stopping the advancement of the piston after the rupture of the fabric being tested by coming into contact with the clamping devices, substantially as specified.

5. In mechanism of the class described, the combination, with annular clamping devices and a plunger provided between its rupturing and pressure-receiving ends with a rack-bar, of a pinion meshing with said rack-bar and carrying an indicator or pointer and a dial, substantially as specified.

6. In mechanism of the class described, the combination of an air chamber for directing pressure against the testing-plunger, a compressing-cylinder, an intermediate wall provided with a port, a piston-operating lever, and lever-locking devices whereby the air-compressing mechanism may be retained in a stated position and the pressure in the compressing-chamber maintained nearly constant for a definite period to give time for the gradual escape of the air from the compressing mechanism into the air-chamber, substantially as specified.

7. In mechanism of the class described, the combination of fabric-clamping devices, a pressure rod or plunger, a piston, air-compressing mechanism, and springs arranged between the piston-rod and piston-head of the air-compressing mechanism and between the plunger and a piston-head in the air-chamber, substantially as and for the purposes specified.

8. In mechanism of the class described, the combination of fabric-clamping devices, constructed to confine a portion of the fabric wholly within its edges, a pressure-rod or piston arranged to bear upon the selected portion of the fabric, air-compressing mechanism for operating the piston or plunger, a spring interposed between said piston and air-compressing mechanism, and a pressure-indicating mechanism, substantially as specified.

9. In mechanism of the class described, the combination of clamping devices, a pressure-rod or piston, an air-chamber in which the piston reciprocates, a spring and disk arranged below the piston, and mechanism for forcing air into the chamber, substantially as specified.

10. In mechanism of the class described, the combination of fabric-clamping devices, a pressure-rod or piston, a sleeve and disk, an interposed spring, an air-chamber, mechanism for forcing air therein, pressure-indicating mechanism mounted upon the sleeve, and an indicating-mechanism-operating device mounted on the piston, substantially as specified.

11. In mechanism of the class described, the combination of a cylinder, a piston-head, a piston-head-operating device, an interposed spring, and a plunger mounted on the spring, substantially as specified.

12. In mechanism of the class described, the combination of a cylinder, a piston-head for the same, a rack-bar, a rod extending from the piston-head through the rack-bar, a sector-lever, and a spring encircling the rod and bearing upon the piston-head and the rack-bar, substantially as specified.

13. In mechanism of the class described, the combination of fabric-clamping devices, a pressure-rod or plunger, an air-chamber, and an escape-valve connected with the pressure-rod or piston, substantially as specified.

14. In mechanism of the class described, the combination of fabric-clamping devices, a pressure-rod or piston, a sleeve encircling the piston and mounted in an air-chamber, a disk arranged at the lower end of the sleeve, a spring arranged between the piston and the disk, and an escape-valve connected with the piston, substantially as specified.

15. In mechanism of the class described, the combination of a base provided with a cylinder, a piston-head and its operating-lever, a superimposed air-chamber, a port connecting the cylinder with the air-chamber, a piston, plunger, or pressure-rod, and concentrically-arranged annular fabric-clamps, substantially as specified.

16. The combination of base A, cylinder B, a piston arranged in said cylinder, a piston-operating lever, I, having the projection $g$, and the rod J, substantially as specified.

17. The combination of the sector-lever I, bar H, spring $m$, rod $o^2$, and piston-head $o\,p\,p'$, together with the cylinder B, base A, and pulley $b$, substantially as specified.

18. The combination of the piston G, independently-movable sleeve F, spring N, disk $v$, and chamber C, and disk or piston-head $v$, substantially as specified.

19. The combination of the piston G, having the flange $k$, the rack $k^3$, the sleeve F, pinion $k^4$, having stop-lug $k^8$, pointer $k^6$, and dial $k^7$, substantially as specified.

20. The combination, with the fixed annular clamp $i$, of the annular clamp $k$ and the cam-lever L, substantially as specified.

21. The combination, with the pressure-rod $k^2$, piston G, sleeve F, and chamber C, of the yoke D, having the collar E, the removable clamp $i$, the clamp K, having the annular arm $j$ and the arm $h$, and the lever L, substantially as specified.

In testimony whereof I affix my signature in presence of two witnesses.

SYLVANUS D. LOCKE.

Witnesses:
N. W. LOCKE,
J. P. LOCKE.